(12) United States Patent
Barmeier et al.

(10) Patent No.: US 10,254,050 B2
(45) Date of Patent: Apr. 9, 2019

(54) THERMAL ENERGY STORAGE WITH REDUCED INTERNAL NATURAL CONVECTION

(71) Applicant: Siemens Aktiengesellschaft, München (DE)

(72) Inventors: Till Andreas Barmeier, Hamburg (DE); Vladimir Danov, Erlangen (DE); Dirk Koschnitzke, Könnern (DE); Theodoros Papadopoulos, München (DE); Henrik Stiesdal, Odense C (DE); Victor Ustinov, Fuerth (DE)

(73) Assignee: Siemens Aktiengesellschaft (DE)

( * ) Notice: Subject to any disclaimer, the term of this patent is extended or adjusted under 35 U.S.C. 154(b) by 64 days.

(21) Appl. No.: 15/114,882

(22) PCT Filed: Dec. 19, 2014

(86) PCT No.: PCT/EP2014/078614
§ 371 (c)(1),
(2) Date: Jul. 28, 2016

(87) PCT Pub. No.: WO2015/113708
PCT Pub. Date: Aug. 6, 2015

(65) Prior Publication Data
US 2016/0348986 A1     Dec. 1, 2016

(51) Int. Cl.
*F28D 20/00* (2006.01)
*F28F 9/02* (2006.01)
(Continued)

(52) U.S. Cl.
CPC .............. *F28D 20/00* (2013.01); *F28F 9/028* (2013.01); *F28F 9/0263* (2013.01);
(Continued)

(58) Field of Classification Search
CPC ............. F28D 20/025; F28D 2020/021; F28D 2020/069; F28F 9/026; F28F 9/0278; F28F 9/028
(Continued)

(56) References Cited

U.S. PATENT DOCUMENTS

| 4,347,892 | A | * | 9/1982 | Clyne et al. | ............ F28D 20/02 |
| | | | | | 126/645 |
| 4,807,696 | A | | 2/1989 | Colvin et al. | |
| 5,038,850 | A | * | 8/1991 | Choi | ....................... F24D 11/00 |
| | | | | | 165/10 |
| 2009/0056919 | A1 | * | 3/2009 | Hoffman | ............. F24D 17/0005 |
| | | | | | 165/109.1 |

(Continued)

FOREIGN PATENT DOCUMENTS

CN       203100506 U       7/2013
DE   10 2011 100219 A1   11/2012
(Continued)

OTHER PUBLICATIONS

European Search Report for Application No. 14153446.1, dated May 6, 2014.
(Continued)

*Primary Examiner* — Allen J Flanigan
(74) *Attorney, Agent, or Firm* — Schmeiser, Olsen & Watts LLP

(57) ABSTRACT

A thermal energy storage is provided comprising a housing, a thermal energy storage structure arranged within the housing, the thermal energy storage structure comprising thermal energy storage elements and a plurality of dividing elements, the plurality of dividing elements being arranged such that the thermal energy storage elements are divided into a plurality of layers, a fluid inlet, the fluid inlet being in fluid communication with the housing and adapted to receive a working fluid and provide a flow of working fluid (Continued)

towards the housing, and a convection reducing structure arranged adjacent the thermal energy storage structure at a side of the thermal energy storage structure that faces the fluid inlet. Furthermore, a method of storing thermal energy and a steam power plant for producing electrical energy are described.

12 Claims, 2 Drawing Sheets

(51) Int. Cl.
    *F28F 13/06*     (2006.01)
    *F28F 21/04*     (2006.01)
    *F28F 9/22*     (2006.01)

(52) U.S. Cl.
    CPC .......... *F28F 9/0265* (2013.01); *F28F 9/0278* (2013.01); *F28F 13/06* (2013.01); *F28F 21/04* (2013.01); *F28D 2020/0069* (2013.01); *F28D 2020/0086* (2013.01); *F28F 2009/224* (2013.01); *Y02E 60/142* (2013.01)

(58) Field of Classification Search
    USPC .................................................. 165/10, 174
    See application file for complete search history.

(56) References Cited

U.S. PATENT DOCUMENTS

| | | | |
|---|---|---|---|
| 2009/0194250 A1* | 8/2009 | Kudo | F24H 7/04 |
| | | | 165/10 |
| 2013/0206356 A1* | 8/2013 | Pedretti | F28D 20/0056 |
| | | | 165/10 |
| 2015/0113806 A1* | 4/2015 | Couturier | F28D 20/0056 |
| | | | 29/890.03 |
| 2015/0136115 A1* | 5/2015 | Bruch | F28D 20/0039 |
| | | | 126/620 |

FOREIGN PATENT DOCUMENTS

| | | | | |
|---|---|---|---|---|
| EP | 2589762 A1 | 5/2013 | | |
| EP | 2594753 A1 | 5/2013 | | |
| JP | 4899943 B2 * | 3/2012 | ......... | F28D 20/0034 |

OTHER PUBLICATIONS

International Search Report for PCT Application No. PCT/EP2014/078614, dated Apr. 22, 2016.

Chinese language Office Action for CN Application No. 201480074569.9, dated Jan. 31, 2018.

* cited by examiner

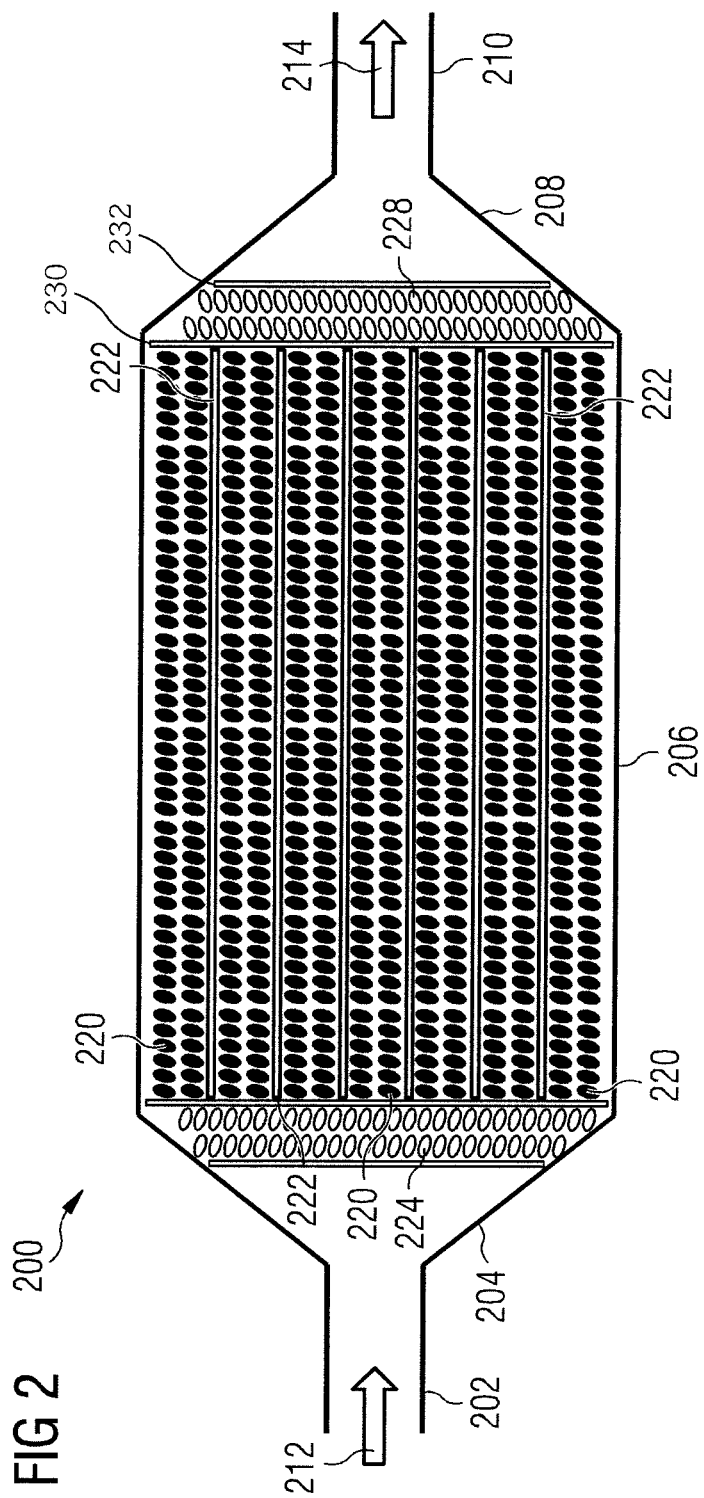

THERMAL ENERGY STORAGE WITH REDUCED INTERNAL NATURAL CONVECTION

CROSS-REFERENCE TO RELATED APPLICATIONS

This application claims priority to PCT Application No. PCT/EP2014/078614, having a filing date of Dec. 19, 2014, based off of European application No. EP 14153446.1, having a filing date of Jan. 31, 2014, the entire contents of which are hereby incorporated by reference.

FIELD OF TECHNOLOGY

The following relates to the field of thermal energy storages, in particular to thermal energy storages with reduced internal natural convection.

BACKGROUND

Thermal energy storages play an important role in the improvement of the stability of power supply networks and for increasing the energy efficiency. There are different types of thermal energy storages depending on how the energy is stored (using heat capacity of a material or using phase change enthalpy or even using chemical reaction enthalpy). Generally, these thermal storages are facilities that are filled with thermal storage elements, which have the ability to be heated up and keep a certain temperature. The thermal storage elements are heated (charged) through a working flow of fluid (gas, liquid or a mixture thereof), which has a higher temperature than the thermal storage elements. The stored energy can be recovered through a flow of fluid (with the same or a different composition), which has a lower temperature than the thermal storage elements.

When the charged thermal energy storage is at a standstill period, i.e. a period where no charging or discharging flow of working fluid is fed to the storage, a flow of fluid may still be created within the storage because of natural convection phenomena (temperature gradients). These streams can both stress the materials (mechanical stress) and create a non-uniform temperature profile in the storage. For these reasons, the creation of such streams caused by natural convection should be avoided.

Known attempts at solving this problem involve the use of horizontal or vertical plates within a thermal energy storage to limit convection within the structure of thermal storage elements during standstill.

In the case of vertical plates, i.e. plates that are perpendicular to the flow direction, the plates may be placed alternately in the upper and lower part of the storage. Such a pattern reduces the convection in the storage but at the same increases the pressure losses during charging and discharging of the storage. Moreover, this pattern cannot provide a uniform temperature distribution in the thermal energy storage during the standstill period. After some time, the hot fluid will be collected in the upper part of the structure, while colder fluid will be present in the lower part of the structure. Such temperature gradients may cause stress and potentially damage to the thermal storage elements.

In the case of horizontal plates, i.e. plates that are parallel to the flow direction, a number of plates are installed in the main storage between layers of thermal storage elements in order to limit the free volume for the fluid, within which it can move. Thereby, natural convection is limited within the structure of thermal storage elements, as a flow of fluid is prevented by the plates. However, in cases where an empty space exists at the front and/or at the back (relative to the direction of flow) of the thermal storage structure, natural convection may still occur within such empty space(s), thereby effectively by-passing the horizontal plates. The result is that, also in this case, after some time of standstill, the hot fluid will be collected in the upper layers of thermal storage elements, while colder fluid will be collected in the lower layers of thermal storage elements.

Accordingly, there may be a need for an improved thermal energy storage which does not suffer from the above-mentioned drawbacks of the known storages.

SUMMARY

An aspect relates to providing a thermal energy storage. The described thermal energy storage comprises (a) a housing, (b) a thermal energy storage structure arranged within the housing, the thermal energy storage structure comprising (b1) thermal energy storage elements and (b2) a plurality of dividing elements, the plurality of dividing elements being arranged such that the thermal energy storage elements are divided into a plurality of layers, (c) a fluid inlet, the fluid inlet being in fluid communication with the housing and adapted to receive a working fluid and provide a flow of working fluid towards the housing, and (d) a convection reducing structure arranged adjacent the thermal energy storage structure at a side of the thermal energy storage structure that faces the fluid inlet.

This aspect of embodiments of the invention are based on the idea that by arranging a convection reducing structure adjacent a layered thermal energy storage structure (i.e., a thermal storage structure comprising a plurality of layers of thermal storage elements, wherein the layers are separated by dividing elements) at a side of the thermal energy storage structure that faces a fluid inlet, convection in a space or room between the fluid inlet and the thermal energy storage structure can be significantly reduced or prevented. Thereby, convection from one layer to another through the aforementioned space or room (i.e. convection by-passing the dividing elements) is significantly reduced or prevented, such that a constant and uniform temperature distribution can be maintained in the thermal energy storage structure during standstill.

The housing may be made of a heat-resistant material, such as steel or ceramics, and may have a cylindrical shape with a rectangular, quadratic, circular, elliptic or polygonal shape. Depending on the application, the housing may have a cross-sectional area of 25 $m^2$ or more.

The thermal energy storage elements preferably have a large heat storage capacity and are arranged in layers divided by dividing elements to form the thermal energy storage structure. The thermal storage elements are dimensioned and spaced apart from each other such that each layer allows a flow of working fluid, in particular in a direction parallel to the layer. The dividing elements substantially prevent a flow of working fluid from one layer to another, thereby preventing heat convection between the layers, in particular during standstill where no flow of working fluid is supplied to the thermal energy storage.

The fluid inlet may be made of the same material as the housing and may have a similar or different cross-sectional size and shape. The fluid inlet may be connected to an external source of working fluid, such as a vaporizer of a steam power plant. In use, the fluid inlet is adapted to direct a flow of received working fluid towards the housing such that the working fluid flows through the thermal energy storage structure and stores thermal energy therein (charging) or receives thermal energy therefrom (discharging).

For charging the thermal energy storage, the working fluid may e.g. comprise water (in particular hot steam), air, nitrogen or argon. For discharging the thermal energy storage, the working fluid may e.g. comprise water, steam, air, nitrogen or argon.

The convection reducing structure is arranged between the thermal energy storage structure and the fluid inlet and serves to prevent heat convection between the layers of thermal energy storage elements, i.e. heat convection that by-passes the dividing elements of the thermal storage structure.

The convection reducing structure is preferably designed to allow a sufficient flow of working fluid towards the thermal energy storage structure when the working fluid is supplied under pressure to the fluid inlet in order to store thermal energy in or recover thermal energy from the thermal energy storage structure. During standstill, the convection reducing structure limits a flow of fluid from one layer (e.g. a lower layer) of the thermal energy storage elements to another layer (e.g. an upper layer), thereby limiting natural convection.

According to an embodiment of the invention, the convection reducing structure comprises a layer of convection reducing elements extending in a direction perpendicular to the layers of thermal storage elements.

In other words, the convection reducing structure is formed as a wall-like structure of convection reducing elements in front of the thermal energy storage structure.

The layer of convection reducing elements may have a thickness of around 40% or less of the height of the thermal energy storage structure, such as around 35%, 30%, 25% or 20% of the height of the thermal energy storage structure.

The convection reducing elements may comprise the same material as the thermal storage elements or a similar or different material. The size and spacing of the convection reducing elements may be similar to the size and spacing of the thermal storage elements. Preferably, the convection reducing elements are smaller than the thermal storage elements.

According to a further embodiment of the invention, the convection reducing structure comprises at least one perforated plate for supporting the layer of convection reducing elements.

The at least one perforated plate has substantially the same size as the convection reducing structure and comprises a plurality of perforations or holes. The holes may have any suitable shape, such as circular, elliptic, quadratic, rectangular, triangular or polygonal.

The at least one perforated plate is designed to allow passage of a working fluid through the perforations during charging and discharging of the thermal energy storage without causing significant pressure loss. Furthermore, the at least one perforated plate is designed to support the convection reducing structure by keeping the convection reducing elements in place.

The at least one perforated plate may be arranged on either side of the convection reducing structure, i.e. facing the fluid inlet or facing the thermal storage structure. In one embodiment, a perforated plate may be arranged on both sides of the convection reducing structure.

According to a further embodiment of the invention, the thermal energy storage further comprises a diffuser section arranged between the fluid inlet and the housing, wherein the diffuser section has in increasing cross section in a direction from the fluid inlet towards the housing.

The diffuser section serves to enhance the distribution of working fluid that enters the thermal energy storage structure, in particular by providing a constant distribution of fluid across the cross section of the housing. The increasing cross section of the diffuser section in the direction towards the housing reduces the flow speed of the working fluid to a level suitable for exchanging thermal energy with the thermal energy storage structure as the working fluid flows through the thermal energy storage structure.

To further enhance the function of the diffuser section, one or more diffusing elements may be arranged within the diffuser section to influence the flow of fluid through the diffuser section.

The convection reducing structure is preferably arranged at a transition between the diffuser section and the housing.

According to a further embodiment of the invention, the thermal energy storage further comprises a fluid outlet, the fluid outlet being in fluid communication with the housing and adapted to receive a flow of working fluid from the housing.

Thereby, a working fluid entering the thermal energy storage through the fluid inlet may, after interacting with the thermal storage structure in the housing, leave the thermal energy storage through the fluid outlet. When discharging the thermal energy storage, the output working fluid may e.g. be used to produce steam for a steam power plant or to heat up another medium for e.g. an organic rankine cycle (ORC) or a supercritical $CO_2$ cycle.

According to a further embodiment of the invention, the thermal energy storage further comprises a further convection reducing structure arranged adjacent the thermal energy storage structure at a side of the thermal energy storage structure that faces the fluid outlet.

The further convection reducing structure is arranged between the thermal energy storage structure and the fluid outlet and, like the convection reducing structure, serves to prevent heat convection between the layers of thermal energy storage elements, i.e. heat convection that by-passes the dividing elements of the thermal storage structure.

The further convection reducing structure may be similar to or different from the convection reducing structure.

According to a further embodiment of the invention, the further convection reducing structure comprises a layer of convection reducing elements extending in a direction perpendicular to the layers of thermal storage elements.

The further convection reducing structure is preferably formed as a wall-like structure of convection reducing elements behind (i.e. downstream) the thermal energy storage structure. Also the further convection reducing structure may be supported by at least one perforated plate.

According to a further embodiment of the invention, the thermal storage elements and the convection reducing elements comprise a material selected from the group consisting of stone, lava stone, brick, granite, basalt, and ceramics.

According to a further embodiment of the invention, an average size of the convection reducing elements is between 10% and 50% of an average size of the thermal storage elements, such as between 15% and 45%, such as between 20% and 40%, such as between 25% and 35%, such as around 30%.

By using smaller convection reducing elements than thermal storage elements an effective prevention of by-passing convection can be achieved.

According to a further embodiment of the invention, the dividing elements comprise sheets or plates of material through which the working fluid cannot flow.

The sheets or plates may comprise any suitable heat resistant material, such as metal, synthetic fabric or the like, that are substantially impermeable for the working fluid.

According to a second aspect of embodiments of the invention there is provided a power plant for producing electrical energy, such as a steam power plant, an organic rankine cycle (ORC) power plant or a supercritical carbon dioxide cycle (sCO$_2$) power plant. The described power plant comprises a thermal energy storage according to the first aspect or any of the embodiments described above.

By using the thermal energy storage, the power plant is capable of storing energy in situations where production exceeds demand and then using it later when demand exceeds production.

The power plant may be part of or operating in conjunction with a wind power plant, which often has very varying production due to changes in wind speed and direction.

According to a third aspect of embodiments of the invention there is provided a method of storing thermal energy. The described method comprises (a) providing a flow of working fluid through an inlet towards a housing of a thermal energy storage, wherein the thermal energy storage comprises a thermal energy storage structure arranged within the housing, the thermal energy storage structure comprising thermal energy storage elements and a plurality of dividing elements, the plurality of dividing elements being arranged such that the thermal energy storage elements are divided into a plurality of layers, wherein the fluid inlet is in fluid communication with the housing and adapted to receive a working fluid and provide a flow of working fluid towards the housing, and wherein the thermal energy storage comprises a convection reducing structure arranged adjacent the thermal energy storage structure at a side of the thermal energy storage structure that faces the fluid inlet.

This aspect of embodiments of the invention are based on essentially the same idea as the first aspect described above, namely that a convection reducing structure arranged between a layered thermal storage structure and a fluid inlet may provide a constant and uniform temperature distribution in the thermal energy storage structure during standstill.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of the present invention are apparent from the examples of embodiments to be described hereinafter and are explained with reference to the examples of embodiments. The invention will be described in more detail hereinafter with reference to examples of embodiments. However, it is explicitly noted that the invention is not limited to the described exemplary embodiments.

BRIEF DESCRIPTION

FIG. 2 shows a side-view of a thermal energy storage.

DETAILED DESCRIPTION

Figure 1:
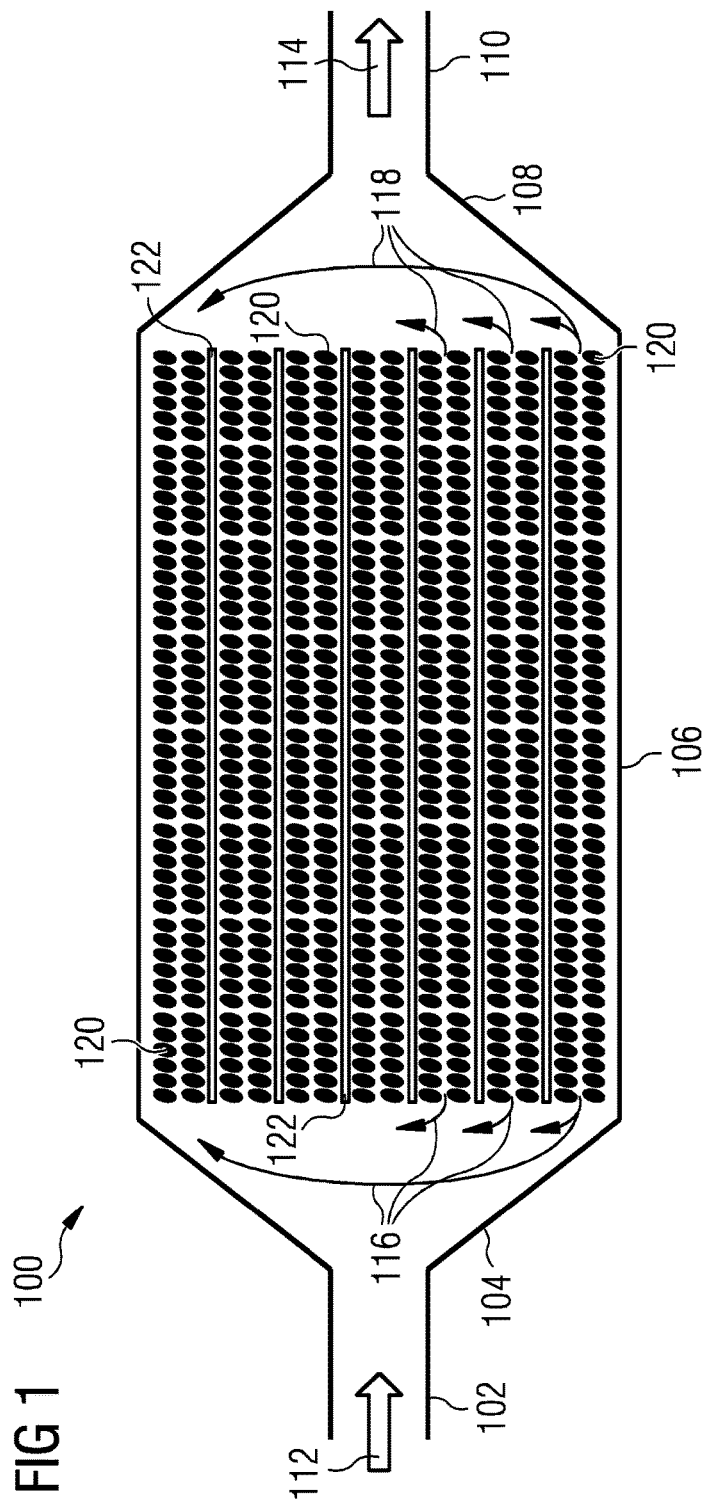
FIG. 1 shows a side-view of a known thermal energy storage.

The illustrations in the drawings are schematic. It is noted that in different figures, similar or identical elements are provided with the same reference numerals or with reference numerals which differ only within the first digit.

FIG. 1 shows a side-view of known thermal energy storage 100. The thermal energy storage 100 comprises a fluid inlet 102 for receiving a working fluid, such as water, hot or cold steam, air, nitrogen or argon, as indicated by arrow 112. The thermal energy storage 100 further comprises a diffuser section 104 for evenly distributing the working fluid and for reducing the flow speed of the working fluid. The thermal energy storage 100 further comprises a housing 106 comprising thermal storage elements 120, such as bricks, stone, lava stone, granite, basalt or ceramics provided as bulk material. The thermal storage elements 120 are separated into a layered thermal energy storage structure by dividing elements 122, such as steel plates or metal sheets. The thermal energy storage 100 further comprises a nozzle section 108 for increasing flow speed and pressure of the working fluid leaving the thermal energy storage structure in the housing 106 and forwarding it to fluid outlet 110 for ejection from the thermal energy storage 100, as indicated by arrow 114.

The thermal energy storage system 100 may be charged with thermal energy by feeding a hot working fluid, such as hot steam, to the fluid inlet 102. The working fluid will flow through the layers of thermal energy storage elements 120 in the thermal energy storage structure and thereby heat up the thermal storage elements 120. The cooled working fluid leaves the storage 100 via the fluid outlet 110. After the charging is completed, the storage 100 may be left in a standstill period of hours or even days until the stored thermal energy is needed and discharged by feeding a cold working fluid, such as water, to the fluid inlet 102. After flowing through the thermal energy storage structure in housing 106, the heated working fluid is ejected from the The dividing elements 122 are provided to prevent a change in the temperature distribution within the thermal energy storage structure due to natural convection during the standstill period, i.e. that hot fluid surrounding thermal storage elements in the lower part of the housing 106 flows to the upper part of the housing 106. However, due to the open space within the diffuser section 104, some natural convection may still occur from the lower layers towards the upper layers as indicated by the arrows 116. Accordingly, after a longer standstill period, the temperature distribution within the thermal storage structure will nevertheless. This is undesirable, as it causes stress on the thermal storage elements 120 structure and makes it difficult to achieve an output flow with a desired temperature when discharging the storage.

FIG. 2 shows a side-view of thermal energy storage 200 according to an embodiment of the present invention. The overall structure and function of the thermal energy storage 200 is similar to the thermal energy storage 100 discussed above. Accordingly, a repeated description of similar and identical elements is omitted, and only additional and different features specific to the thermal energy storage 200 are described in the following. The dividing elements 222 are provided to prevent a change in the temperature distribution within the thermal energy storage structure due to natural convection during the standstill period, i.e. that hot fluid surrounding thermal storage elements in the lower part of the housing 206 flows to the upper part of the housing 206.

The thermal energy storage 200 comprises a convection reducing structure provided as a vertical layer of convection reducing elements 224 in front of the thermal energy storage structure in housing 206 on the side facing the fluid inlet 202. Furthermore, the thermal energy storage 200 also comprises a convection reducing structure provided as a vertical layer of convection reducing elements 228 behind the thermal energy storage structure in housing 206, i.e. on the side facing the fluid outlet 210.

The convection reducing structures are arranged adjacent the thermal energy storage structure (respectively on the upstream and downstream side thereof) such that they prevent the problematic natural convection during standstill that was discussed above. In particular, the convection indicated by arrows 116 and 118 in FIG. 1 cannot occur (or is at least reduced to an insignificant amount) due to the convection reducing elements 224 and 228.

The convection reducing elements 224 and 228 are made of the same or a similar bulk material as the thermal energy storage elements 220 but are preferably smaller than these. Where the average size of the thermal energy storage elements 220 may be about 2 cm to 3 cm, the average size of the convection reducing elements may be about 0.5 cm to 1 cm.

The convection reducing elements 224 and 228 are kept in the desired positions (i.e. at the transition between the diffuser section 204 and the housing 206 respectively at the transition between the housing 206 and nozzle section 208) by perforated metal plates 230, 232. Furthermore, an opening (not shown) may be provided for adding convection reducing elements 224 and 228 as necessary after a certain time of operation in case the flow of working fluids through the convection reducing structures 224 and 228 "blows away" some of the convection reducing elements 224 and 228.

The thermal energy storage 200 shown in FIG. 2 is capable of storing thermal energy for a long standstill period while maintaining a uniform temperature distribution within the structure. Thereby, an extended lifetime of the thermal energy storage elements 220 is achieved and a constant temperature of the output fluid from the storage can be provided.

The thermal energy storage 200 may advantageously be used for temporarily storing excess energy at power production plants when production temporarily exceeds demand, e.g. in connected with a wind power plant which is susceptible to varying wind speeds and wind directions.

It is noted that the term "comprising" does not exclude other elements or steps and the use of the articles "a" or "an" does not exclude a plurality. Also elements described in association with different embodiments may be combined. It is further noted that reference signs in the claims are not to be construed as limiting the scope of the claims.

The claims are as follows:

1. A thermal energy storage, comprising:
    a housing,
    a thermal energy storage structure arranged within the housing, the thermal energy storage structure including thermal energy storage elements and a plurality of dividing elements, the plurality of dividing elements being arranged such that the thermal energy storage elements are divided into a plurality of layers,
    a fluid inlet, the fluid inlet being in fluid communication with the housing and adapted to receive a working fluid and provide a flow of working fluid towards the housing, and
    a convection reducing structure arranged adjacent the thermal energy storage structure at a side of the thermal energy storage structure that faces the fluid inlet, wherein the convection reducing structure comprises at least one perforated plate for supporting a layer of convection reducing elements.

2. The thermal energy storage according to claim 1, further comprising a diffuser section arranged between the fluid inlet and the housing, wherein the diffuser section has an increasing cross section in a direction from the fluid inlet towards the housing.

3. The thermal energy storage according to claim 1, further comprising a fluid outlet, the fluid outlet being in fluid communication with the housing and adapted to receive a flow of working fluid from the housing.

4. The thermal energy storage according to claim 3, further comprising a further convection reducing structure arranged adjacent the thermal energy storage structure at a side of the thermal energy storage structure that faces the fluid outlet.

5. The thermal energy storage according to claim 4, wherein the further convection reducing structure comprises a layer of convection reducing elements extending in a direction perpendicular to the layers of thermal storage elements.

6. The thermal energy storage according to claim 1, wherein the thermal storage elements and the convection reducing elements comprise a material selected from the group consisting of stone, lava stone, brick, granite, basalt, and ceramics.

7. The thermal energy storage according claim 1, wherein the dividing elements comprise sheets or plates of material through which the working fluid cannot flow.

8. A power plant for producing electrical energy, comprising a thermal energy storage according claim 1.

9. A method of storing thermal energy, the method comprising
    providing a flow of working fluid through an inlet towards a housing of a thermal energy storage,
    wherein the thermal energy storage comprises a thermal energy storage structure arranged within the housing, the thermal energy storage structure comprising thermal energy storage elements and a plurality of dividing elements, the plurality of dividing elements being arranged such that the thermal energy storage elements are divided into a plurality of layers,
    wherein the fluid inlet is in fluid communication with the housing and adapted to receive a working fluid and provide a flow of working fluid towards the housing, and
    wherein the thermal energy storage comprises a convection reducing structure, including a bulk material, arranged adjacent the thermal energy storage structure at a side of the thermal energy storage structure that faces the fluid inlet, wherein the convection reducing structure comprises at least one perforated plate for supporting the layer of convection reducing elements.

10. A thermal energy storage comprising:
    a housing,
    a thermal energy storage structure arranged within the housing, the thermal energy storage structure including thermal energy storage elements and a plurality of dividing elements, the plurality of dividing elements being arranged such that the thermal energy storage elements are divided into a plurality of layers,
    a fluid inlet, the fluid inlet being in fluid communication with the housing and adapted to receive a working fluid and provide a flow of working fluid towards the housing, and
    a convection reducing structure made of the same material as the thermal energy storage elements and arranged adjacent the thermal energy storage structure at a side of the thermal energy storage structure that faces the fluid inlet, wherein the convection reducing structure comprises at least one perforated plate for supporting the layer of convection reducing elements.

11. The thermal energy storage according to claim 10, wherein the convection reducing structure includes bulk material.

12. The thermal energy storage according to claim 11, wherein the bulk material is selected from brick, stone, lava stone, granite, basalt or ceramic.

* * * * *